(12) United States Patent  
Aila et al.

(10) Patent No.: US 9,176,736 B2  
(45) Date of Patent: *Nov. 3, 2015

(54) SYSTEM AND METHOD FOR PERFORMING PREDICATED SELECTION OF AN OUTPUT REGISTER

(71) Applicant: NVIDIA Corporation, Santa Clara, CA (US)

(72) Inventors: Timo Oskari Aila, Tuusula (FI); Samuli Matias Laine, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,474

(22) Filed: Sep. 5, 2013

(65) Prior Publication Data

US 2014/0006754 A1    Jan. 2, 2014

Related U.S. Application Data

(63) Continuation of application No. 12/780,963, filed on May 17, 2010, now Pat. No. 8,555,036.

(51) Int. Cl.  
*G06F 9/30* (2006.01)  
*G06F 7/38* (2006.01)  
*G06F 15/00* (2006.01)  
*G06F 9/00* (2006.01)  
*G06F 9/44* (2006.01)

(52) U.S. Cl.  
CPC .............. *G06F 9/30058* (2013.01); *G06F 7/38* (2013.01); *G06F 9/00* (2013.01); *G06F 9/44* (2013.01); *G06F 15/00* (2013.01)

(58) Field of Classification Search  
None  
See application file for complete search history.

(56) References Cited

U.S. PATENT DOCUMENTS

2005/0038978 A1* 2/2005 Nickolls et al. ............... 712/209

* cited by examiner

*Primary Examiner* — Corey S Faherty  
(74) *Attorney, Agent, or Firm* — Zilka-Kotab, PC

(57) ABSTRACT

A system includes a processor having an instruction register for storing an instruction having a predefined opcode, a predicate register for storing a predicate condition to select an output register for a result of the instruction, a first output register, and a second output register. The processor further includes processor circuitry operable to execute the instruction to produce a result, and processor circuitry operable to store the result of the instruction in the first output register if the predicate condition to select the output is true, and to store the second output register if the predicate condition to select the output is false. A single instruction is used to produce the result, and to store the result of the instruction.

17 Claims, 4 Drawing Sheets

SYSTEM AND METHOD FOR PERFORMING PREDICATED SELECTION OF AN OUTPUT REGISTER

CROSS REFERENCE TO RELATED APPLICATIONS

This application is a continuation of U.S. application Ser. No. 12/780,963, filed May 17, 2010, the entire contents of which are incorporated herein by reference. This application incorporates by reference in its entirety each of the following commonly-owned, filed US non-provisional patent applications:

U.S. application Ser. No. 12/780,964 entitled "System and Method for Accelerated Ray-Box Intersection Testing," and U.S. application Ser. No. 12/780,965 entitled "System and Method for Performing Ray Tracing Node Traversal in Image Rendering."

BACKGROUND

The present invention is related to a system and method for selecting an output register for storing the result of an executed instruction, and more particularly to a system and method for performing a predicated selection of an output register for storing the instruction's result.

Ray-box intersection testing is a technique known in the field of ray-tracing, whereby a ray is tested for intersection with a box of a particular dimension.

Using conventional instructions, the ray-box intersection test requires 19 instructions (the pseudo-code for which is shown):

DEFINITIONS

B=Box (xmin,ymin,zmin,xmax,ymax,zmax)
O=ray origin (x,y,z)
D=ray direction (x,y,z)
invD=(1/D.x,1/D.y,1/D.z)
OoD=(O.x/D.x,O.y/D.y,azliz)
tminray=ray segment's minimum t value
tmaxray=ray segment's maximum t value
RAY-BOX
//Plane intersections (6× multiply-add)
float x0=B.xmin*invD[x]−OoD[x];
float y0=B.ymin*invD[y]−OoD[y];
float z0=B.zmin*invD[z]−OoD[z];
float   x1=B.xmax*invD[x]−OoD[x];   P   float y1=B.ymax*invD[y]−OoD[y];
float z1=B.zmax*invD[z]−OoD[z];
//Span intersection (12× min/max)
float tminbox=max(tminray,min(x0,x1),min(y0,y1),min(z0,z1));
float tmaxbox=min(tmaxray,max(x0,x1),max(y0,y1),max(z0,z1));
//Overlap test (1× compare)
boot intersect=(tminbox<=tmaxbox);
return (tminbox,tmaxbox,intersect)

The large number of instructions needed to perform the ray-box test creates a significant bottleneck in the ray-tracing computation. Accordingly, what is needed is a system and method which can carry out the ray-box intersection test more rapidly.

SUMMARY

The present invention provides a system and method to overcome the aforementioned disadvantages, and in particular enable a ray-box test to be carried out using fewer instructions. In a particular embodiment, the system includes a processor having an instruction register for storing an instruction having a predefined opcode, a predicate register for storing a predicate condition to select an output register for a resu of the instruction, a first output register, and a second output register. The processor further includes processor circuitry operable to execute the instruction to produce a result, and processor circuitry operable to store the result of the instruction in the first output register if the predicate condition to select the output is true, and to store the second output register if the predicate condition to select the output is false. A single instruction is used to produce the result, and to store the result of the instruction.

These and other aspects and features of the invention will be understood in view of the following drawings and description of exemplary embodiments.

For clarity, previously-defined features retain their reference indicia in subsequent drawings.

DETAILED DESCRIPTION OF EXEMPLARY EMBODIMENTS

Figure 1:
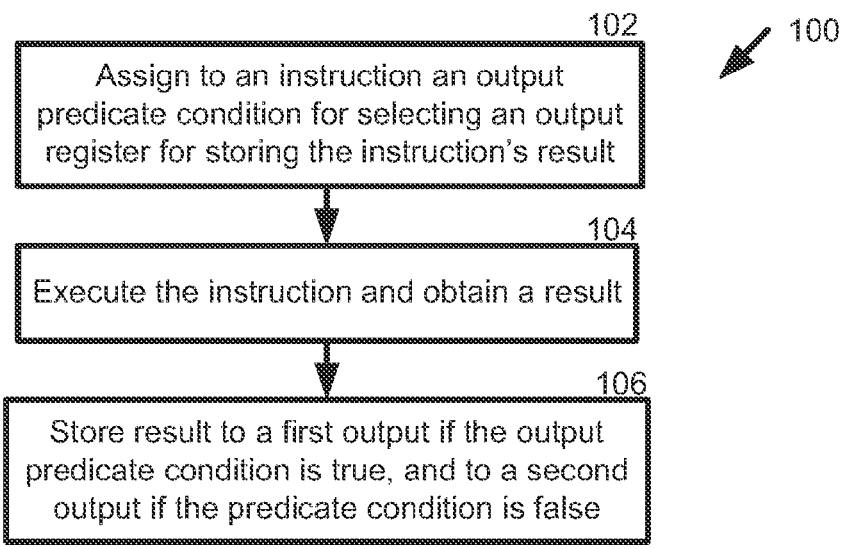
FIG. 1 illustrates a first exemplary method for performing a predicated selection of an output register for storing an instruction's result in accordance with the invention.

FIG. 1 illustrates a first exemplary method 100 for performing a predicated selection of an output register for storing an instruction's result in accordance with the invention. At 102, an executable instruction is assigned an output predicate condition for selecting an output register into which the instruction's result is written/stored. At 104, the instruction is executed. At 106, the instruction's result is stored to a first output register if the output predicate condition is true, and the result is stored to a second output register if the output predicate condition is false. In a particular embodiment, the operations 104 and 106 of executing and storing the result to the first or second output register are performed using a single instruction. In a further embodiment, operation 102 is performed separately from (e.g., prior to) operations 104 and 106.

The following pseudo-code illustrates an exemplary instruction in accordance with FIG. 1.

($P?Rd0:Rd1$)=$OP Ra,Rb,Rc$

If the output predicate condition P is true, the result of opcode OP is written to output register R.d0. If P is false, the result is written to output register Rd1. Terms Ra, Rb and Re are input arguments.

As can be understood, this instruction replaces two predicated instructions:

@$PRd0$=$OP Ra,Rb,Rc$

@!$PRd1$=$OP Ra,Rb,Rc$

Above, the expression "@P" means the instruction is executed if P is true, and the expression "@!P" means the instruction is exeucted if P is false.

The obtainable performance improvement, compared to above conventional solution, is therefore proportional to the fraction of instructions benefiting from this method.

Figure 2:
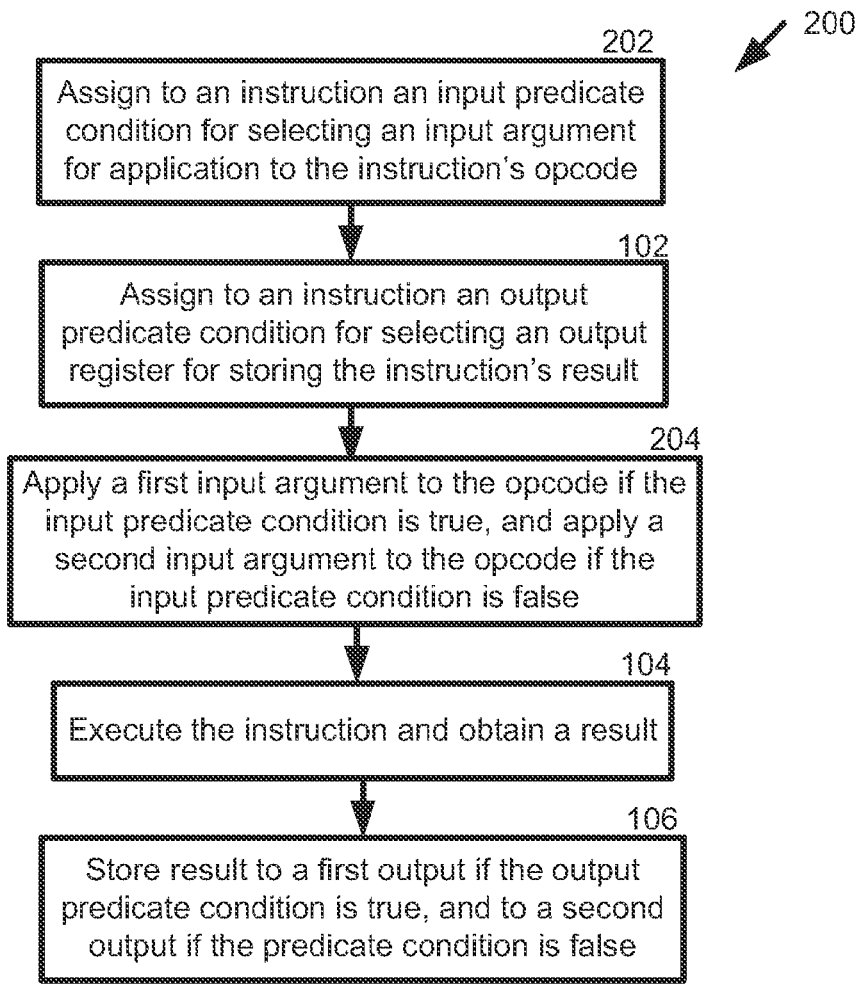
FIG. 2 illustrates a second exemplary method for performing a predicated selection of an output register for storing an instruction's result in accordance with the invention.

FIG. 2 illustrates a second exemplary method 200 for performing a predicated selection of an output register for storing an instruction's result in accordance with the invention, in which previously defined operations retain their reference indicia. In this method, the predicated selection of an output register shown in FIG. 1 is combined with a predicated selection of an input argument.

Operation 202 includes assigning to the executable instruction, an input predicate condition for selecting between two input arguments/operands, one of which is to be applied to the instruction's opcode. Operation 102 includes assigning an output predicate condition for selecting between two output registers, as described in FIG. 1 above. Operation 204 includes applying a first input argument to the instruction's opcode if the input predicate condition is true, and a second input argument to the instruction's opcode if the input predicate condition is false. Operations 104 and 106 are as described above, whereby the instruction is executed and a result obtained, and the result is stored in a first output register if the output predicate condition is true and stored in a second output register if the output predicate condition is false. In a particular embodiment, the operations 204, 104, and 106 of applying the first or second input argument, executing the instruction to obtain a result, and storing the result to the first or second output register are performed using a single instruction. In a further embodiment, operations 202 and 102 (one or both) are performed separately from (e.g., prior to) operations 204, 104 and 106. In another embodiment, operations 202, 102, 204, 104 and 106 are carried out using a single instruction.

The following pseudo-code shows an exemplary format of an instruction in accordance with FIG. 2, the pseudo code including an output predicate condition P(O) for selecting output registers Rd0 and Rd1 and an input predicate condition P(I) for selecting input arguments Ra0 and Ra1:

$(P(O)?Rd0:Rd1)=OP(P(I)48\ Ra0:Ra1),Rb,Rc$

Figure 3:
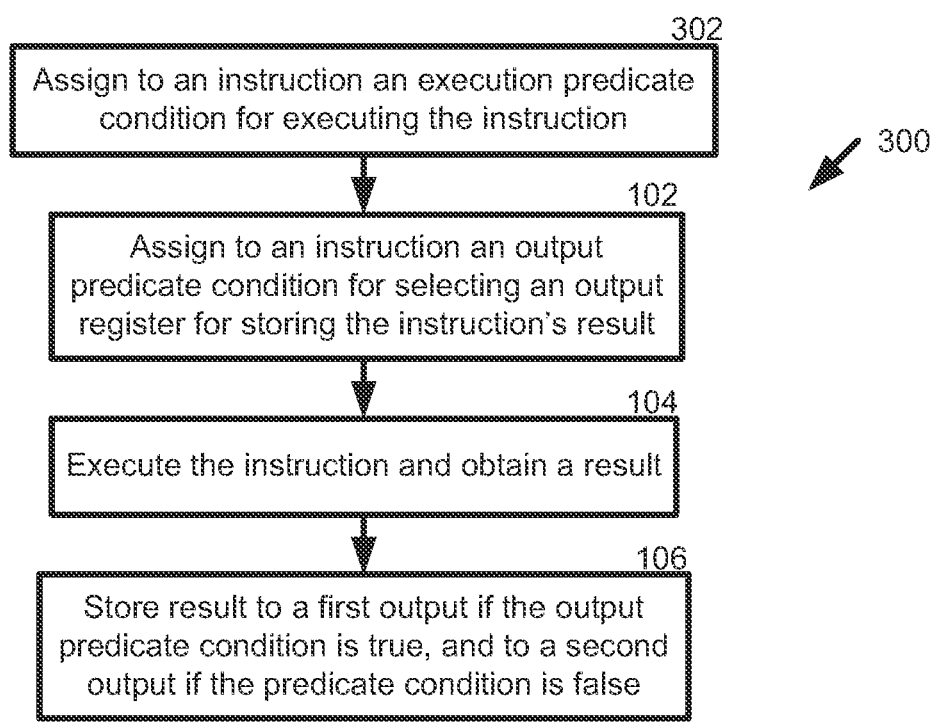
FIG. 3 illustrates a third exemplary method for performing a predicated selection of an output register for storing an instruction's result in accordance with the invention.

FIG. 3 illustrates a third exemplary method 300 for performing a predicated selection of an output register for storing an instruction's result in accordance with the invention, in which previously defined operations retain their reference indicia. In this method, the predicated selection of an output register shown in FIG. 1 is combined with the predicated execution of an instruction.

Operation 302 includes assigning to the executable instruction, a predicate condition for executing an instruction P(E). Operation 102 includes assigning an output predicate condition P(O) for selecting between two output registers, as described in FIG. 1 above. If the predicate condition for executing the instruction P(E) is true, operation 104 is carried out, whereby the instruction is executed and a result obtained, and the result is stored in a first output register if the output predicate condition is true and stored in a second output register if the output predicate condition is false. If the predicate condition for executing the instruction P(E) is false, the instruction is not executed. In a particular embodiment, the operations 102-106 are performed using a single instruction. In a further embodiment, operations 302 and 102 one or both) are performed separately from (e.g., prior to) operations 104 and 106. In another embodiment, operations 302, 102, 104 and 106 are carried out using a single instruction.

The following pseudo-code shows an exemplary format of an instruction in accordance with FIG. 3, the pseudo code including a predicate condition for executing the instruction P(E), and an output predicate condition P(O) for selecting output registers Rd0 and Rd1:

$@P(E)(P(O)?Rd0:Rd1)=OP\,Ra,Rb,Rc$

If the instruction execution predicate P(E) is true, the instruction is executed, whereby if the output predicate condition P(O) is true, the result of opcode OP is written to output register Rd0. If the instruction is executed and the output predicate P(O) is false, the result is written to output register Rd1. Terms Ra, Rb and Rc are input arguments. If the instruction execution predicate P(E) is false, the instruction is not executed. For example, operations 102, 104 and 106 are not carried out if the execution predicate condition for the instruction is false. Alternatively, operation 102 may be carried out irrespective of the state of the execution predicate condition (i.e., whether it is true of false).

Figure 4:
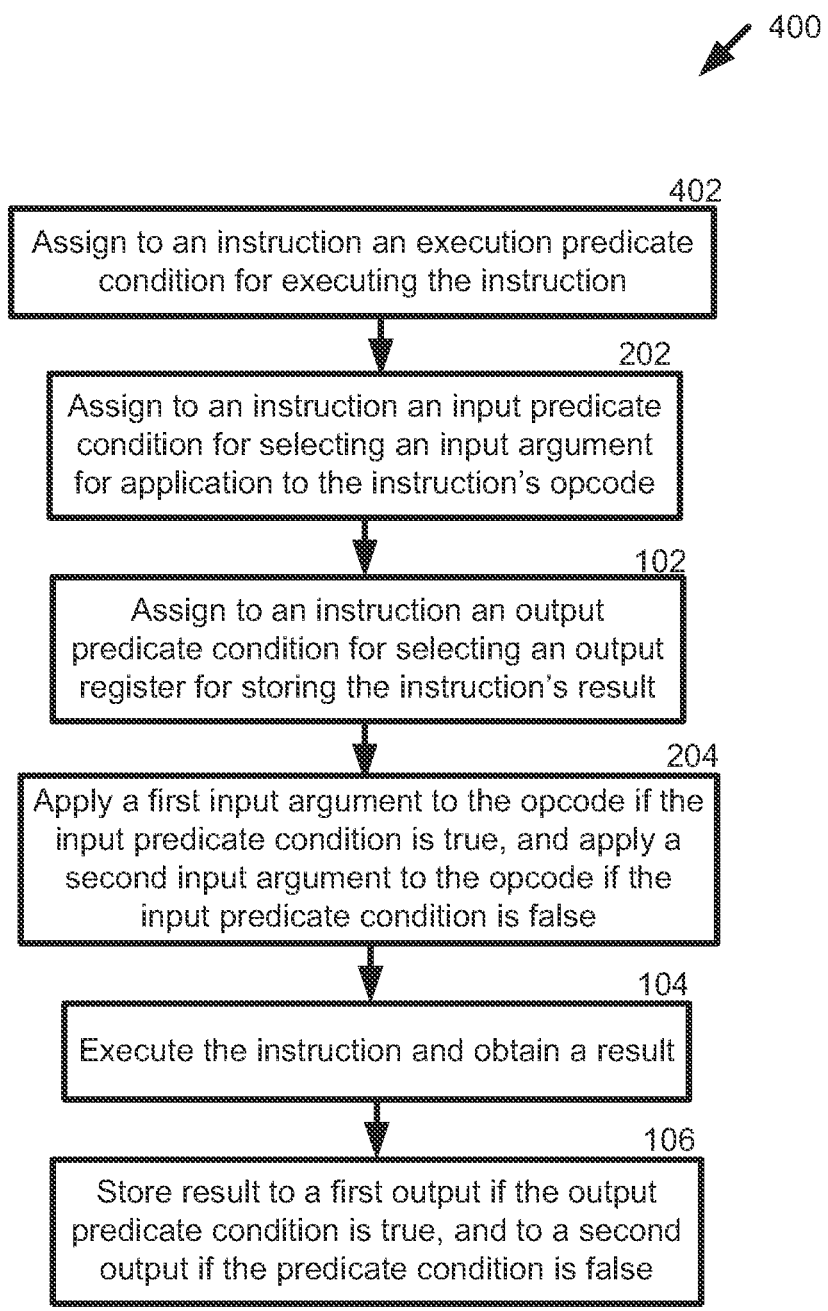
FIG. 4 illustrates a fourth exemplary method for performing a predicated selection of an output register for storing an instruction's result in accordance with the invention.

FIG. 4 illustrates a fourth exemplary method 400 for performing a predicated selection of an output register for storing an instruction's result in accordance with the invention, in which previously defined operations retain their reference indicia. In this method, the predicated selection of an output register and input operand shown in FIG. 2 is combined with the predicated execution of an instruction.

Operation 402 includes assigning to the executable instruction, a predicate condition for executing an instruction P(E). Operations 202, 102, 204, 104, and 106 are as described above. At operation 202, an input predicate condition P(I) is assigned to the instruction for selecting between two input arguments/operands, one of which is to be applied to the instruction's opcode. Operation 102 includes assigning an output predicate condition P(O) for selecting between two output registers, as described in FIG. 1 above. Operation 204 includes applying a first input argument to the instruction's opcode if the input predicate condition is true, and a second input argument to the instruction's opcode if the input predicate condition is false. Operations 104 and 106 are as described above, whereby the instruction is executed and a result obtained, and the result is stored in a first output. register if the output predicate condition is true and stored in a second output register if the output predicate condition is false. In a particular embodiment, the operations 204, 104, and 106 of applying the first or second input argument, executing the instruction to obtain a result, and storing the result to the first or second output register are performed using a single instruction. In a further embodiment, operations 402, 202 and 102 (one, several, or all) are performed separately from (e.g., prior to) operations 204, 104 and 106. In another embodiment, operations 402, 202, 102, 204, 104 and 106 are carried out using a single instruction. Further exemplary, operations 202, 102, 204, 104 and 106 are not carried out if the execution predicate condition for the instruction is false. Alternatively, operations 202 and/or 102 (either one or both) may be carried out irrespective of the state of the execution predicate condition (i.e., whether it is true of false).

The following pseudo-code shows an exemplary format of an instruction in accordance with FIG. 4, the pseudo code including an instruction execution predicate condition P(E) for determining whether the instruction is to be executed, an output predicate condition P(O) for selecting output registers Rd0 and Rd1, and an input predicate condition P(I) for selecting between input arguments Ra0 and Ra1:

$@P(E)(P(O)?Rd0{:}Rd1)=OP(P(I)?Ra0{:}Ra1),Rb,Rc$

If the instruction execution predicate P(E) is true, the instruction is executed. Upon execution of the instruction, a selection is made between the input operands Ra0 and Ra1, depending upon the state of the input predicate condition P(I), The result of the instruction is written to output register Rd0 or Rd1, depending upon the state of the output predicate condition P(O). If the instruction execution predicate P(E) is false, the instruction is not executed.

In an exemplary application, each of the methods of FIGS. 1-4 is carried out as a part of a larger ray-tracing image rendering process, in which a node traversal operation and a primitive intersection operation are implemented. Specifically, a primitive intersection operation may be carried out using a ray-box intersection test, as described in the Applicant's commonly-owned, copending US non-provisional application "System and Method for Accelerated Ray-Box Intersection Testing in Image Rendering," Atty Dkt. No. HE-08-0481 US, herein incorporated by reference in its entirety. Further particularly, the ray-box intersection test may employ operations as described herein, in which the predicated selection of an output register is employed. Once the node traversal and primitive intersection operations of the ray tracing process are concluded, a scene of the intersected geometric primitives can be drawn or rendered using techniques known to the skilled person in computer graphics and rendering.

Figure 5:
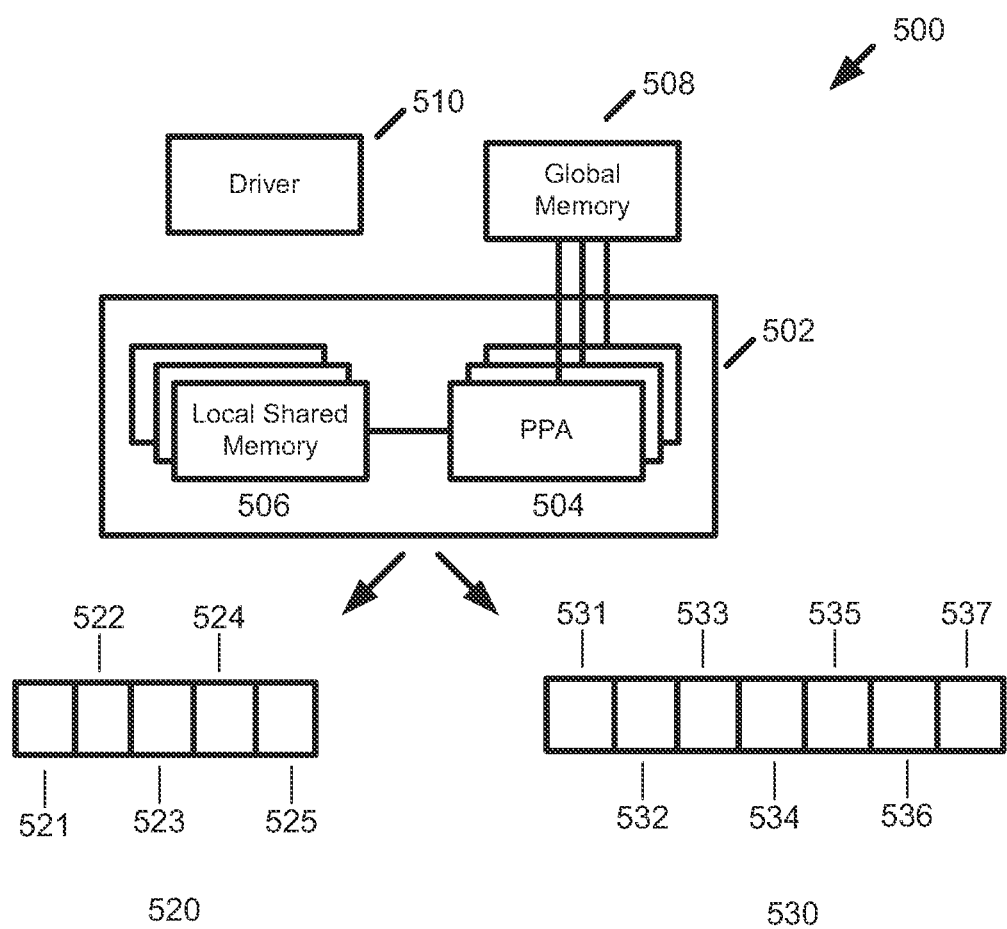
FIG. 5 illustrates an exemplary system operable to execute the methods of FIGS. 1-4.

FIG. 5 illustrates an exemplary system 500 operable to execute the operations illustrated in FIGS. 1-4. System 500 may be implemented on a variety of different platforms, for example, a computer or workstation, a game console, a hand-held device such as a mobile telephone, or personal digital assistant, a graphics card, or a graphics processing sub-system which is implemented on a motherboard of a larger system such as a computer motherboard or graphics card.

System 500 includes a processor 502 which is operable to perform one or more of the operations illustrated in FIGS. 1-4, In a particular embodiment, the processor 502 which includes a plurality of parallel processing architectures 504, each configured to operate on a predetermined number of threads. Accordingly, each parallel processing architecture 504 may operate in parallel, while the corresponding threads may also operate in parallel. In a particular embodiment, the parallel processing architecture 504 is a single instruction multiple data (SIMD) architecture of a predefined SIMD width or "warp," for example 4, 8, 16, 32, 64, 128, 256, 512 or more threads.

The processor 502 may further include local shared memory 506, which may be physically or logically allocated to a corresponding parallel processing architecture 504. The system 500 may additionally include a global memory 508 which is accessible to each of the parallel processing architectures 504. The system 500 may further include one or more drivers 510 for controlling the operation of the processor 502 in accordance with the methods of FIGS. 1-4, The driver(s) 510 may include one or more libraries for facilitating control of the processor 502.

Further exemplary of a processor operable to process an instruction in accordance with FIG. 1, the processor 502 includes an instruction memory architecture 520, which may be physically located within the local shared memory 506, within the global memory 508, or another memory device (not shown) coupled to system 500. Instruction memory architecture 520 includes an instruction register 521, an output predicate register 522, a first output register 523, a second output register 524, and an argument register 525. The instruction register 521 is operable to store the operation code (opcode) of the instruction which is to be executed. The instruction register 521 may be of any arbitrary size, for example a very long instruction word (VLIW), the length of which may be 8-, 16-, 32-, 64-, 128-, 256-, 512-, 1028-bits long, or longer. Further particular, the instruction may be compatible with the Compute Unified Device Architecture (CUDA™) computing architecture, in particular C for CUDA programming. The instruction may be compatible with other programming languages, for example programming languages used for graphics applications, such as OpenGL and Direct3D.

Register 522 is operable to store the value (logical state) of the output predicate condition which determines in which of the first or second output registers the result of the instruction will be stored. First and second output registers 523 and 524 are operable to store the result of the executed instruction, the result written to one of the output registers 523 and 524 based upon logic state (true or false) of the predicate condition in register 522. Either output register 523 or 524 may be selected to store the result if the predicate condition is true, and the other register will be written to when the predicate condition is false. The argument register 525 is operable to store the input argument (which may be one or more arguments) which is to be applied to the instruction's opcode during execution to produce the result. The registers 521-525 may be any arbitrary size to accommodate the size/width of the data words stored therein.

Further exemplary of a processor operable to process an instruction in accordance with FIG. 2, the processor 502 includes an instruction memory architecture 530, which may be physically located within the local shared memory 506, within the global memory 508, or another memory device (not shown) coupled to system 500. Instruction memory architecture 530 includes an instruction register 531, an output predicate register 532, a first output register 533, a second output register 534, registers 531-534 being as described for registers 521-524 in instruction memory architecture 520. Instruction memory architecture 530 further includes a first argument register 535, a second argument register 536, and an input predicate register 537. The first argument register 535 is operable to store a first argument which is to be applied to the opcode during instruction execution if the input predicate condition is a first logical state (e.g., true), and the second argument register 536 is operable to store a second argument which is to be applied to the opcode during instruction execution if the input predicate condition is a second logical state (e.g., false). The instruction memory further includes an input predicate register 537 which is operable to store the value (logical state) of the input predicate condition. The registers 521-525 may be any arbitrary size to accommodate the size/width of the data words stored therein.

The instruction memory architectures 520 and 530 are included within a larger instruction set architecture of the processor 502, the instruction set architecture of the processor 502 including the aforementioned instructions and registers, along with other components such as addressing, interrupt and exception handling modules, as known in the art of instruction set architecture design. Similarly, the instructions described herein may be included within an instruction set which is operable on the processor 502. The processor 502 includes processing circuitry and logic gates (i.e., the processor's microarchitecture) such as adders, counters, registers ALUs, etc., to carry out each of the operations described in FIGS. 1-4 above.

The processor 502 may be implemented in various forms, for example, a central processing unit (CPU) intended to operate centrally within a computer or other programmable system. In another embodiment, the processor 502 is implemented as a graphics processing unit (GPU) which may be adapted for visual computing applications, or alternatively, as a general purpose GPU (GPGPU) implemented to carry out many functions normally performed by a CPU. In another embodiment, the processor 502 may be implemented as a microprocessor embedded within a larger/more complex device or system, the microprocessor omitting memory or other peripheral components provided by the larger device/system. A non-exhaustive list of the aforementioned systems which may incorporate the processor 502 of the present invention includes computers, workstations, cellular telephones, game consoles, and motherboards. The present invention can be implemented, e.g., to perform a ray-tracing process which is more computationally efficient compared to conventional techniques for performing ray-tracing. Exemplary applications using the improved ray-tracing process include collision detection, and graphics rendering in computer games, flight simulation, geographic information systems, medical imaging, and other applications in which graphics rendering is used.

Particular embodiments of the processor 502 are as follows:

A processor includes an instruction register (e.g., 521, 531) for storing an instruction having a predefined opcode, a predicate register (e.g., 522, 532) for storing a predicate condition to select an output register for a result of the instruction, a first output register (e.g., 523, 533), and a second output register (e.g., 524, 534). The processor further includes processor circuitry operable to execute the instruction to produce a result in accordance with operation 104, and processor circuitry operable to store the result of the instruction in the first output register if the predicate condition to select the output is true, and the second output register if the predicate condition to select the output is false, in accordance with operation 106. Further particularly, the processor is operable with a single instruction to produce the result and to store the result of the instruction within the selected output register.

The aforementioned processor may further include a second predicate register (e.g., 537) for storing a predicate condition to select an input argument for application to the opcode. In this embodiment, the processor further includes processor circuitry operable to apply a first input argument to the opcode if the predicate condition for selecting the input argument is true, and apply a second input argument to the opcode if the predicate condition for selecting the input argument is false, in accordance with operation 204. Further particularly, the processor is operable with a single instruction to apply the input argument, produce the result, and to store the result of the instruction in accordance with FIG. 2

In an alternative embodiment the second predicate register (e.g., 537) may be used for storing a predicate condition to execute the instruction. In this embodiment, the processor further includes processor circuitry operable to execute the instruction if the predicate condition for executing the instruction is true, and to suspend execution of the instruction if the predicate condition for executing the instruction is false. Further particularly, the processor is operable with a single instruction to produce the result and to store the result of the instruction in accordance with FIG. 3.

Further alternatively, the aforementioned processor employing a first register to store an output predicate condition and a second register to store an input predicate condition may further include a third register (not shown) for storing a predicate condition to execute the instruction. In this embodiment, the processor further includes processor circuitry operable to execute the instruction if the predicate condition for executing the instruction is true, and to suspend execution of the instruction if the predicate condition for executing the instruction is false. Further particularly, the processor is operable with a single instruction to execute the instruction, apply the input argument, produce the result, and to store the result of the instruction in accordance with FIG. 4.

Exemplary, the aforementioned processor may be a parallel processing architecture. Further exemplary, the single instruction is an instruction in a ray-box testing method. Further exemplary, the single instruction is a very long instruction word (VLIW). Further exemplary, the opcode of the single instruction is operable to perform an arithmetic operation.

Particular embodiments of the methods of FIGS. 1 and 2 utilizing the processor 502 are as follows:

Using a processor (e.g. 502) having an instruction register (e.g., 521, 531) storing a instruction having a predefined opcode, a predicate register (e.g., 522, 532) for storing a predicate condition for the selecting an output register operable to store a result of the instruction, a first output register (e.g., 523, 533), and a second output register (e.g., 524, 534), executing an instruction to produce a result in accordance with operation 104, and storing the result of the instruction to the first output register (e.g., 523, 533) if the predicate condition for selecting the output is true, and the second output register (e.g., 524, 534) if the predicate condition for selecting the output is false. Further exemplary, the operations of executing and storing are performed using a single instruction.

Further exemplary to the forgoing operations, the processor includes a second predicate register (e.g., 537) for storing a predicate condition to select an input argument for the opcode. In this embodiment, the method further includes applying a first input argument to the opcode to produce the result if the predicate condition for selecting the input argument is true, and a second input argument to the opcode to produce the result if the predicate condition for selecting the input argument is false, in accordance with operation 204. Further exemplary, the operations of applying the first or second input argument, executing the instruction and storing the result are performed using a single instruction. Alternatively, the second predicate register may store a predicate condition to execute the instruction. Further, in the embodiment in which the processor includes a first predicate register for storing a predicate condition for the selecting an output register and a second predicate register for storing a predicate condition for selecting an input operand, the processor further includes a third predicate register for storing a predicate condition for execution the instruction.

Exemplary, the aforementioned processor may be a parallel processing architecture. Further exemplary, the single instruction is an instruction in a ray-box testing method. Further exemplary, the single instruction is a very long instruction word (VLIW). Further exemplary, the opcode of the single instruction is operable to perform an arithmetic operation.

EXAMPLES

The above-described instructions utilizing predicated selection of output register are useful whenever an algorithm needs to update one of two values based on a predicate. This happens quite often in geometric computations where the predicate typically corresponds to a sign bit. Ray-box intersection test is of particular interest because it is on the critical path of ray tracing implementations. Embodiments of exemplary ray-box intersection tests are disclosed in Applicant's commonly owned, copending US non-provisional application entitled "System and Method for Accelerated Ray-Box Intersection Testing," Atty Dkt No. HE-08-0481 US, herein incorporated by reference in its entirety.

Using the new instructions in which predicated selection of the output register is employed, the previously described ray-box intersection test which required 19 instructions requires only 13 instructions (pseudo-code shown):

RAY-BOX Using new predicated output register
//Plane intersections (6×multiply-add)
(D.x>=0 ? tx0:tx1)=B.xmin*invD[x]−OoD[x];
(D.x>=0 ? tx1:tx0)=B.xmax*invD[x]−OoD[x];
(D.y>=0 ? ty0:ty1)=B.ymin*invD[y]−OoD[A];
(D.y>=0 ? ty1:ty0)=B.ymax*invD[y]−OoD[y];
(D.z>=0 ? tz0:tz1)=B.zmin*invD[z]−OoD[z];
(D.z>=0 ? tz1:tz0)=B.zmax*invD[z]−OoD[z];
//Span intersection (6×min/max)
tmin=max(max(tmin_ray,tx0), max(ty0,tz0));
tmax=min(min(tmax_ray,tx1), min(ty1 ,tz1);
//Overlap test (1×comparison)
bool intersect=(tmin<=tmax);

The three predicates (e.g. D.x>=0) can be determined during and kept registers.

In a specific application, the critical path of a bounding volume hierarchy ray tracer consist of two ray-box tests, 4 memory fetches, and approximately 10 instructions for decision making. Predicated selection of output register thus offers a speedup of approximately 30% (i.e., 2*19+14=52 (conventional) versus 2*13+14=40 (new)) to traversal performance.

In a further example, predicated selection of input arguments is employed in addition to the output register. This allows instructions to modify one of two values. For example,
if(P) tmin0=max(tmin0, tval);
else tmin1=max(tmin1, tval);
updates either tmin1 or tmin1 based on a predicate. By offering predication to both inputs and output, it can be implemented using a single instruction:

$$(P(O)?tmin0:tmin1)=max((P(I)?tmin0:tmin1),tval)$$

This, in conjunction with the fast ray-box test (above) allow a roughly 70% speedup in traversal performance.

As readily appreciated by those skilled in the art, the described processes and operations in FIGS. 1 and 2 may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method comprising:
receiving an instruction having an opcode associated with a first predicate condition and a second predicate condition;
executing the instruction to generate a result;
determining whether the first predicate condition is true;
if the first predicate condition is true, then storing the result of the instruction in a first output register, or
if the first predicate condition is false, then storing the result of the instruction in a second output register; and
determining whether the second predicate condition is true; and
if the second predicate condition is true, then applying a first input argument to the opcode, or
if the second predicate condition is false, then applying a second input argument to the opcode.

2. The method of claim 1, wherein the opcode is associated with a third predicate condition, and wherein executing the instruction is performed only when the third predicate condition is true.

3. The method of claim 1, wherein the instruction is included in a program for performing a ray-box intersection test.

4. The method of claim 1, wherein the instruction is a very long instruction word (VLIW).

5. The method of claim 1, wherein the opcode specifies an arithmetic operation.

6. The method of claim 1, wherein a processor, configured to execute the instruction, includes a first predicate register configured to store the first predicate condition and a second predicate register configured to store the second predicate condition.

7. A non-transitory computer-readable storage medium storing instructions that, when executed by a processor, cause the processor to perform steps comprising:
receiving an instruction associated with a first predicate condition and a second predicate condition;
executing the instruction to generate a result;
determining whether the first predicate condition is true;
if the first predicate condition is true, then storing the result of the instruction in a first output register, or
if the first predicate condition is false, then storing the result of the instruction in a second output register; and determining whether the second predicate condition is true; and if the second predicate condition is true, then applying a first input argument to the opcode, or if the second predicate condition is false, then applying a second input argument to the opcode.

8. The non-transitory computer-readable storage medium of claim 7, wherein the opcode is associated with a third predicate condition, and wherein executing the instruction is performed only when the third predicate condition is true.

9. The non-transitory computer-readable storage medium of claim 7, wherein the instruction is included in a program for performing a ray-box intersection test.

10. The non-transitory computer-readable storage medium of claim 7, wherein the instruction is a very long instruction word (VLIW).

11. The non-transitory computer-readable storage medium of claim 7, wherein the opcode specifies an arithmetic operation.

12. A processor comprising:
an instruction register for storing an instruction having an opcode associated with a first predicate condition and a second predicate condition;
a first predicate register for storing the first predicate condition;
a second predicate register for storing the second predicate condition;
a first output register; and
a second output register,
wherein the processor is configured to:
execute the instruction to generate a result,
determine whether the first predicate condition is true,
if the first predicate condition is true, then storing the result of the instruction in the first output register, or
if the first predicate condition is false, then storing the result of the instruction in the second output register, and
determine whether the second predicate condition is true, and
if the second predicate condition is true, then apply a first input argument to the opcode, or
if the second predicate condition is false, then apply a second input argument to the opcode.

13. The processor of claim 12, wherein the opcode is associated with a third predicate condition, the processor further comprising a third predicate register for storing the third predicate condition, and wherein the processor is further configured to only execute the instruction when the third predicate condition is true.

14. The processor of claim 12, wherein the instruction is included in a program for performing a ray-box intersection test.

15. The processor of claim 12, wherein the instruction is a very long instruction word (VLIW).

16. The processor of claim 12, wherein the processor is a parallel processing architecture.

17. The processor of claim 12, wherein the processor is a graphics processing unit.

\* \* \* \* \*